United States Patent
Berkey

(10) Patent No.: US 8,961,782 B2
(45) Date of Patent: Feb. 24, 2015

(54) WATER FILTERING SYSTEM

(75) Inventor: Edward B. Berkey, Kirkland, WA (US)

(73) Assignee: The Filtrific Co., LLC, Bellevue, WA (US)

( * ) Notice: Subject to any disclaimer, the term of this patent is extended or adjusted under 35 U.S.C. 154(b) by 649 days.

(21) Appl. No.: 13/338,006

(22) Filed: Dec. 27, 2011

(65) Prior Publication Data
US 2013/0001141 A1 Jan. 3, 2013

Related U.S. Application Data
(60) Provisional application No. 61/427,405, filed on Dec. 27, 2010.

(51) Int. Cl.
| | | |
|---|---|---|
| B01D 29/68 | (2006.01) | |
| B01D 29/52 | (2006.01) | |
| B01D 35/26 | (2006.01) | |
| B01D 29/11 | (2006.01) | |
| E03B 1/04 | (2006.01) | |

(52) U.S. Cl.
CPC .............. *B01D 29/52* (2013.01); *B01D 29/684* (2013.01); *B01D 35/26* (2013.01); *B01D 29/117* (2013.01); *B01D 2201/24* (2013.01); *E03B 1/042* (2013.01); *E03B 2001/045* (2013.01)

USPC ............. 210/90; 210/108; 210/411; 210/413; 210/333.01; 210/497.01

(58) Field of Classification Search
None
See application file for complete search history.

(56) References Cited

U.S. PATENT DOCUMENTS

| | | |
|---|---|---|
| 6,241,877 B1 | 6/2001 | Berkey |
| 6,602,408 B1 | 8/2003 | Berkey |
| 7,267,235 B2 | 9/2007 | Sharir |
| 8,734,641 B2 * | 5/2014 | Collins .......................... 210/108 |
| 2009/0294340 A1 * | 12/2009 | Hirs .............................. 210/108 |

* cited by examiner

*Primary Examiner* — Terry Cecil
(74) *Attorney, Agent, or Firm* — Christensen O'Connor Johnson Kindness PLLC

(57) ABSTRACT

Grey water is conveyed to a tank, passed through filters, and pumped to an irrigation system. A floating spray component is provided in the tank to automatically backwash the filters to prevent clogging, moving up and down as the level of water in the tank changes. The filters can be cylindrical and oriented vertically, and a removable, internal filter cartridge can mount the filters. The filters can be accessed through a top, above ground cap, and the carriage can be removed for access to other parts by removing a larger lid.

12 Claims, 13 Drawing Sheets

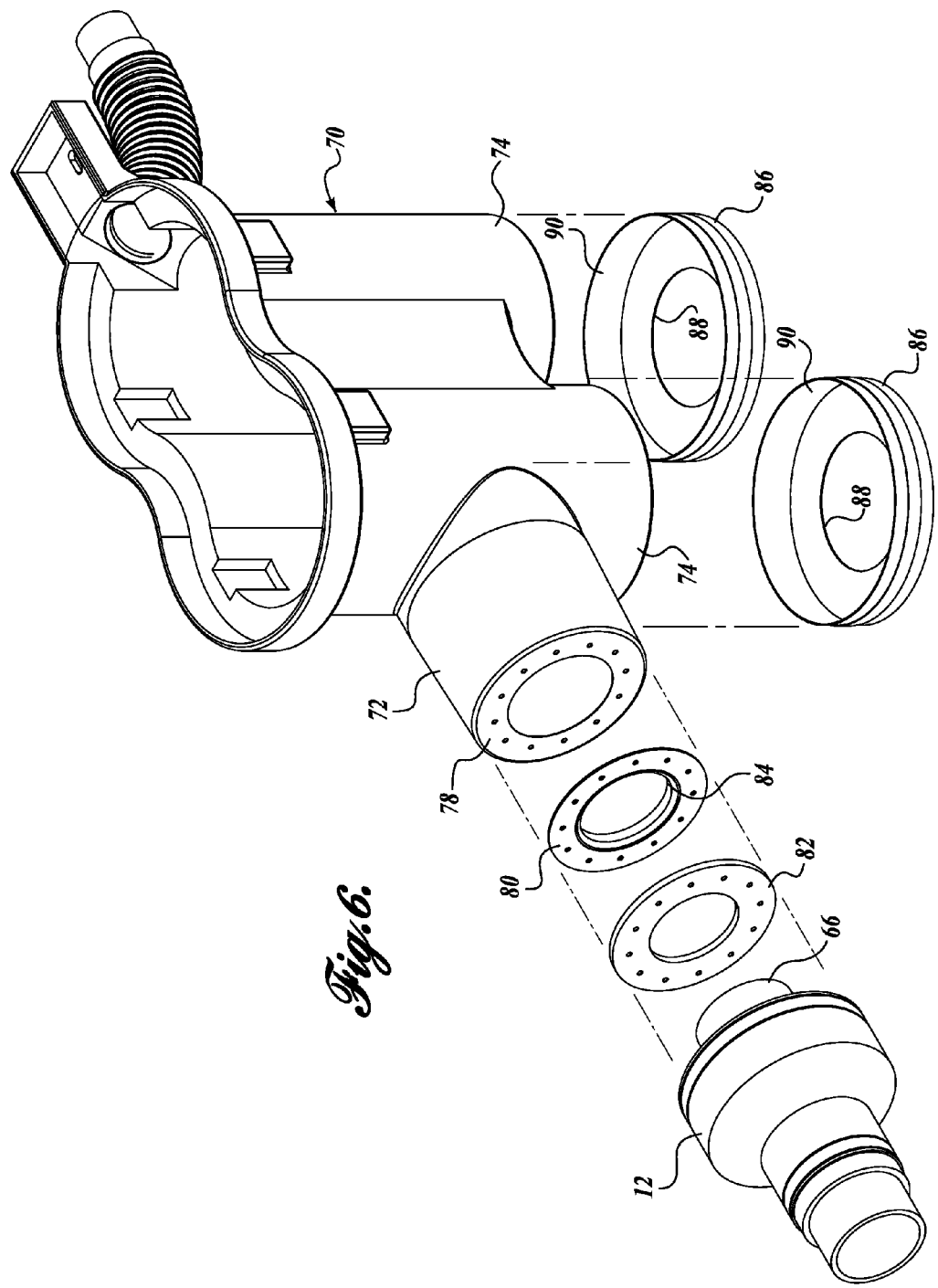

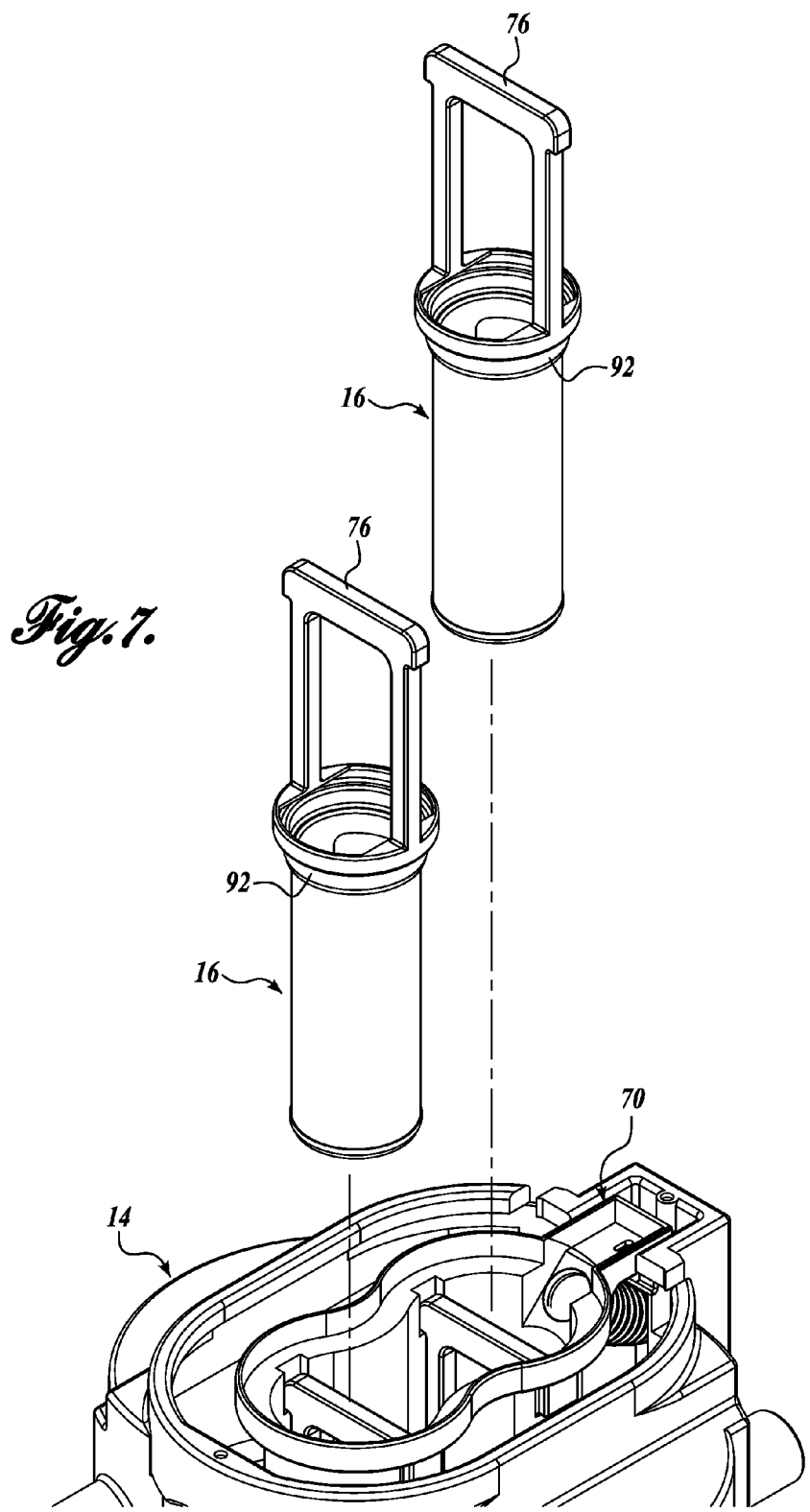

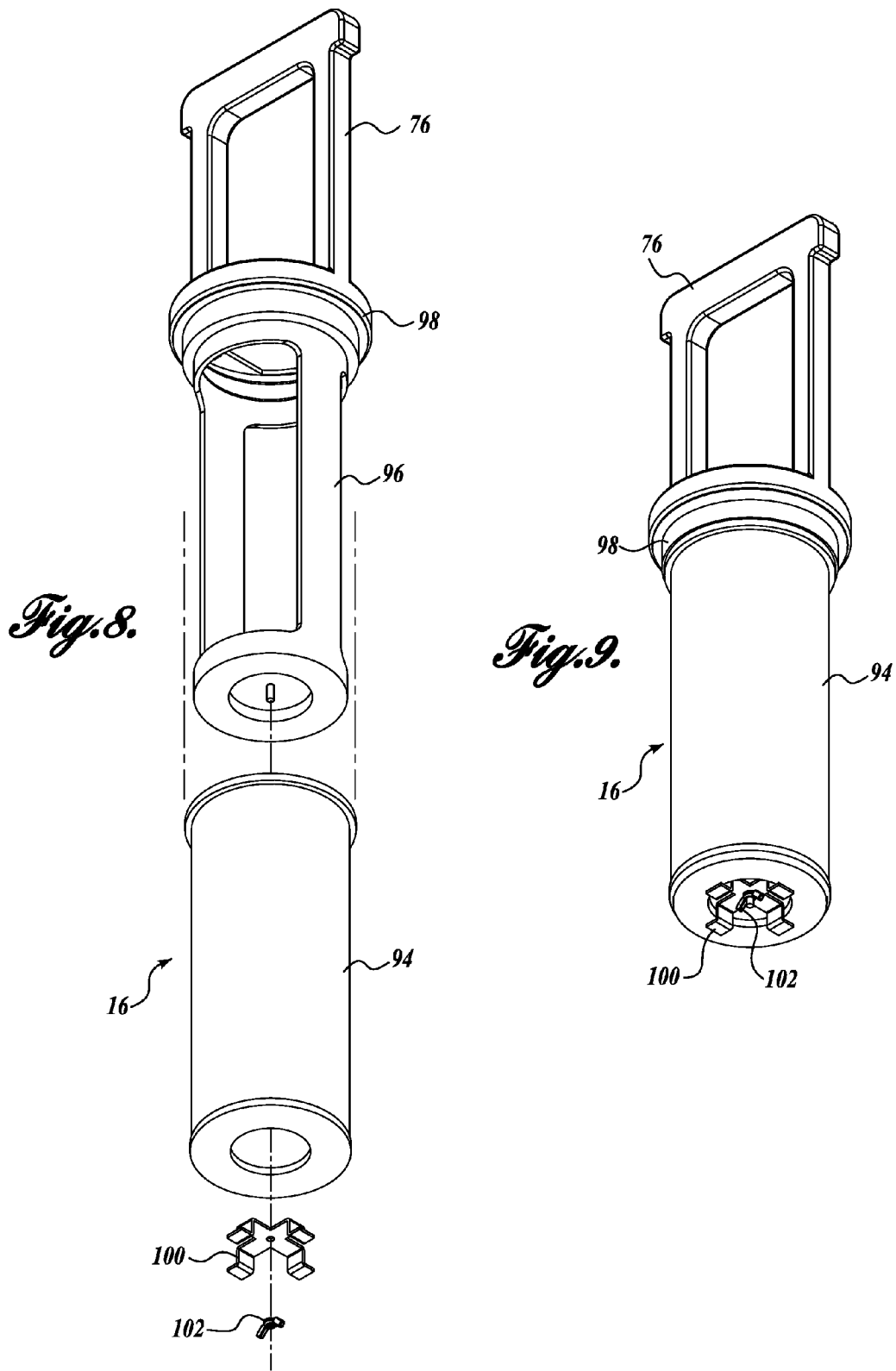

WATER FILTERING SYSTEM

CROSS-REFERENCE TO RELATED APPLICATION

This application claims the benefit of Provisional Application No. 61/427,405, filed Dec. 27, 2010, the disclosure of which is hereby expressly incorporated by reference herein.

BACKGROUND

The present invention pertains to a filtering system for grey water.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

One proposed use for a system in accordance with the present invention is to treat grey water from an establishment, such as a residence, for use in landscape or garden irrigation, such as by a drip irrigation system. In general, the water is conveyed to a tank, passed through filters, and pumped to the irrigation system.

In one aspect of the invention, a floating spray component is provided in the tank to automatically backwash the filters to prevent clogging.

Other aspects of the invention include filter cartridge, filter carrier, tank, lid, cap, secondary filter, and auto-fill components that interfit and/or cooperate for a sturdy and reliable grey water treating system.

Additional aspects of the invention are described in more detail below.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 6 is an inlet side, top perspective illustrating a filter carriage component that can be used in the present invention, with parts shown in exploded relationship;

FIG. 7 is a top perspective of filter cartridge components that can be used in the present invention, showing such cartridge components prior to being fitted in the carriage component and the tank component;

FIG. 8 is a bottom perspective of a filter cartridge component with parts shown in exploded relationship, and FIG. 9 is a corresponding bottom perspective of a filter cartridge component with parts assembled;

DETAILED DESCRIPTION

Figure 1:
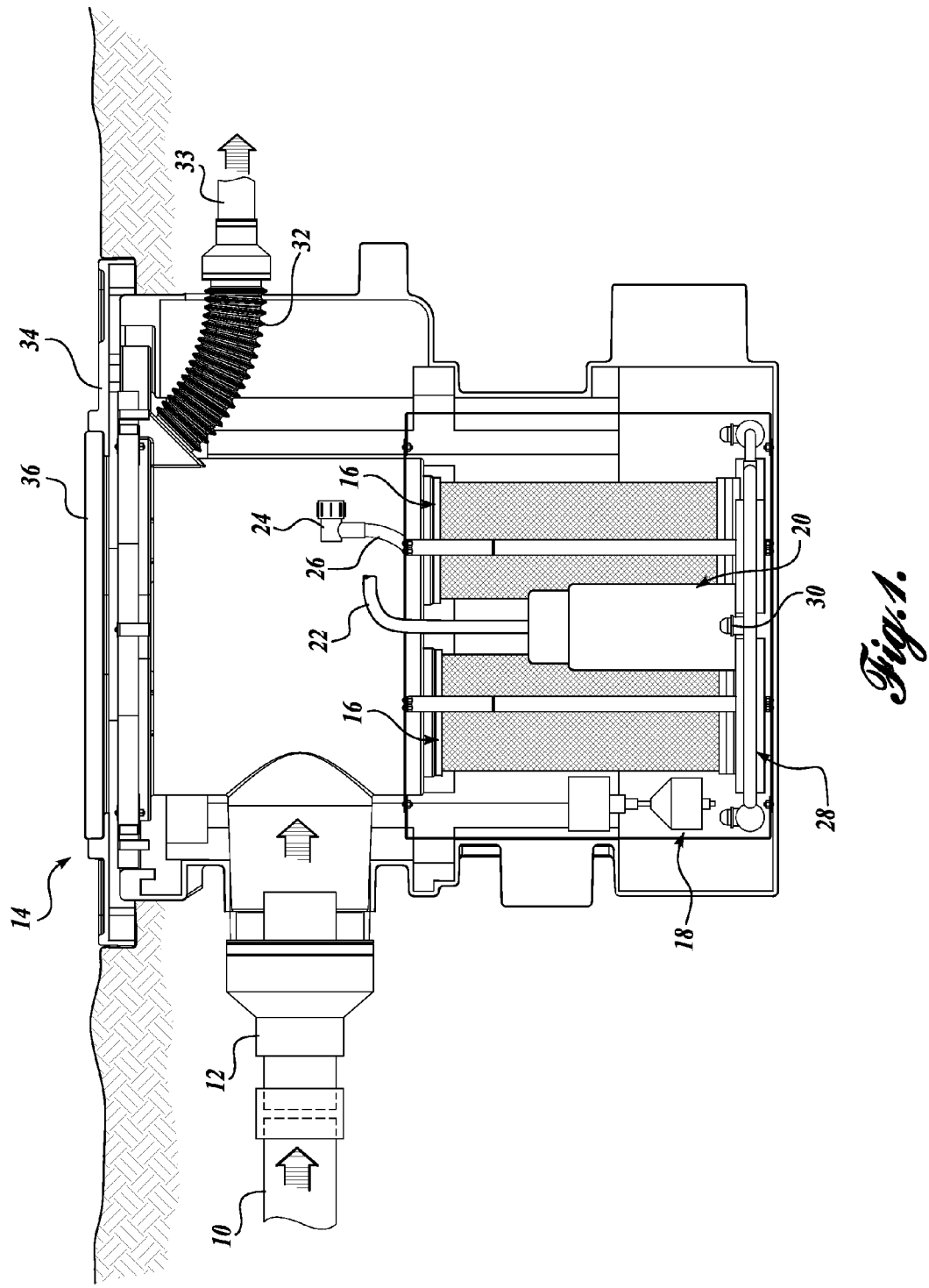
FIG. 1 is a diagrammatic side elevation of components of a water filtering system in accordance with the present invention with some parts shown in section and some parts broken away.

A water filtering system in accordance with the present invention can be used to filter grey water from an establishment, such as a single or multi-family residence, so that the treated water can be used in an irrigation system, such as a drip irrigation system. The grey water may consist of water from laundry, bathing, washing, and so on. With reference to FIG. 1, the grey water flows through an inlet pipe 10 and a fitting 12 into the upper portion of the internal cavity of an underground tank 14. The water passes down through cylindrical filters 16 into the bottom portion of the tank, such filters being interposed between the tank inlet and outlet so that water must pass through the filters when passing from the inlet to the outlet. When the water reaches a predetermined depth, a float switch 18 automatically activates a pump 20 to expel the filtered water through an outlet line 22 that passes out of the tank. In one embodiment, the outlet line 22 leads to a secondary filtering system (described below with reference to FIG. 12), and from the secondary filtering system some of the pressurized water is conveyed back into the tank by a return conduit (described with reference to FIG. 3). The return conduit connects to a fitting 24 for a spray supply conduit 26 that leads to a floating filter backwash assembly 28 (described below with reference to FIGS. 13 and 14). The floating assembly 28 expels backwash water through moderate to high-pressure nozzles 30 which are directed at the exterior sides of the filters 16 to assure that they do not become clogged. In rare instances, the water level in the tank may rise to a level near its top, in which case it may be desirable to expel excess water, which is achieved by an upper overflow tube 32 that leads to an overflow pipe 33. The top of the tank can be closed by an annular lid component 34 and a central cap 36 (described below with reference to FIG. 10).

Figure 2:
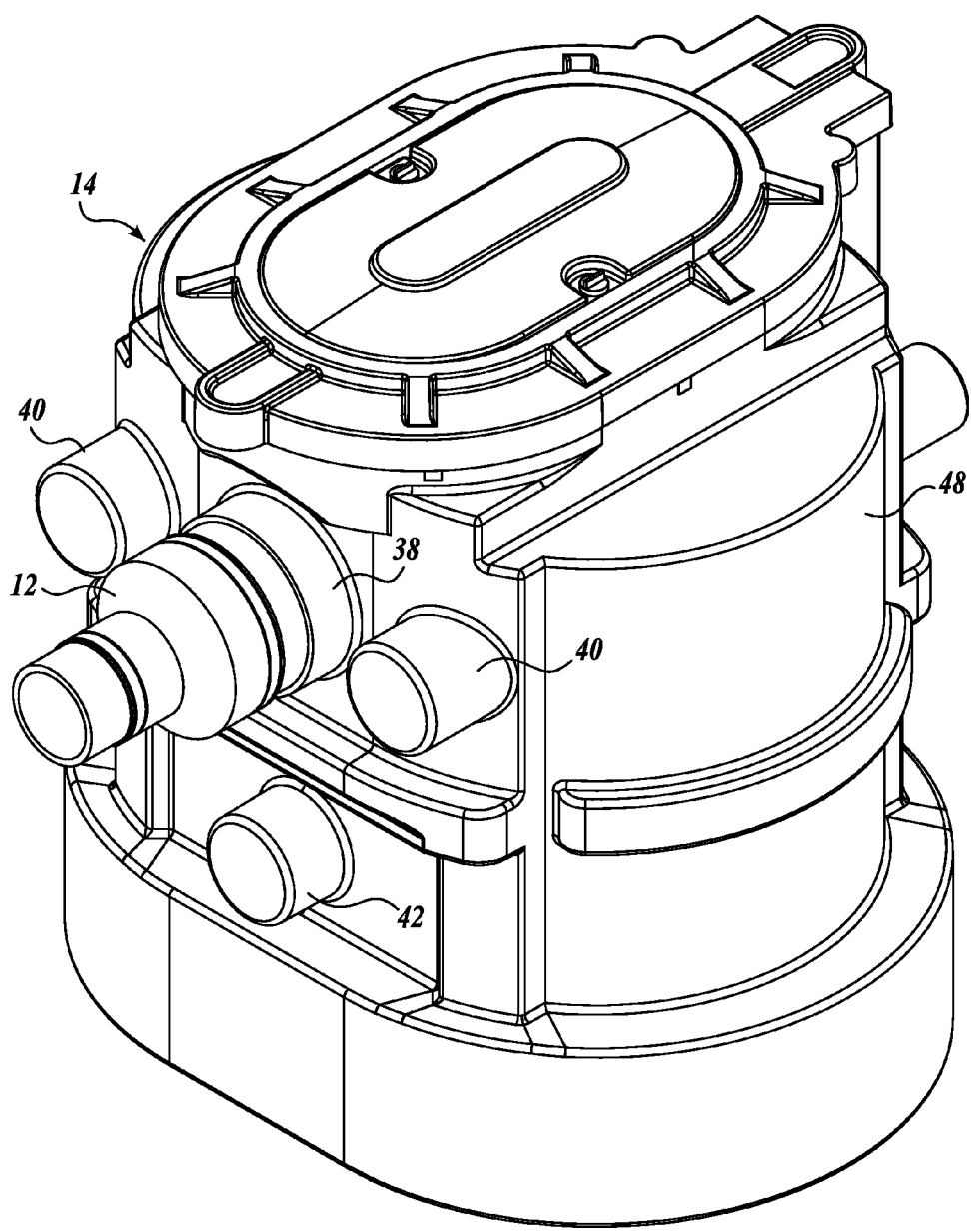
FIG. 2 is an inlet side, top perspective of a water tank component used in one embodiment of the invention.
Figure 3:
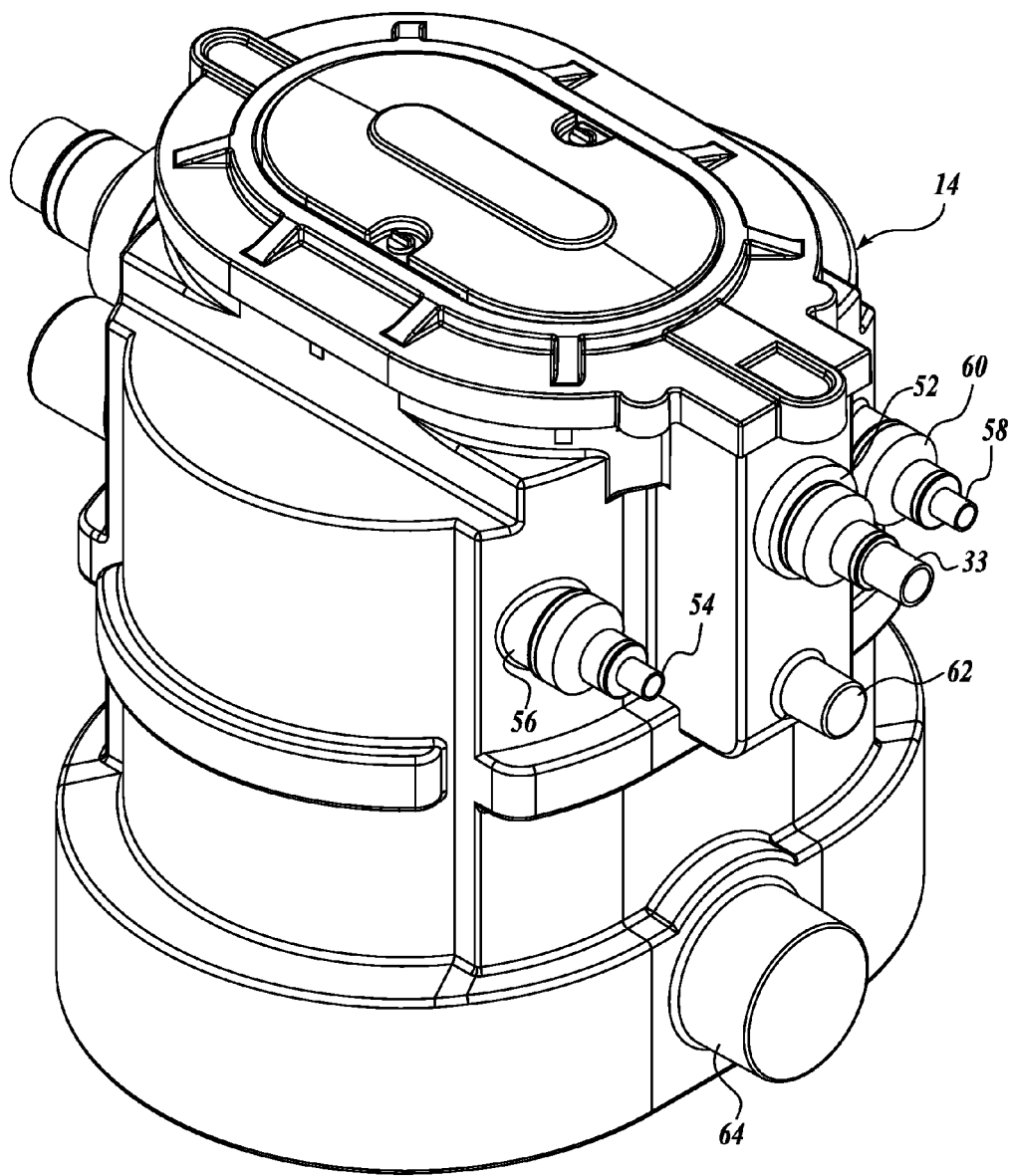
FIG. 3 is an outlet side, top perspective thereof.
Figure 4:
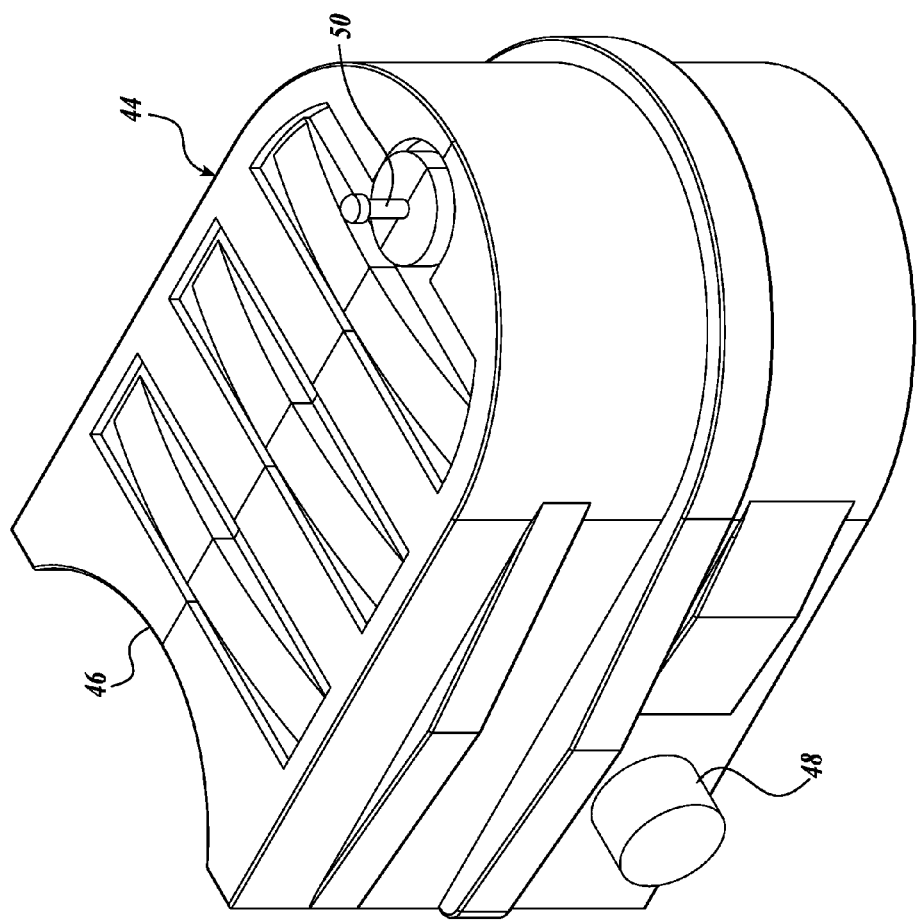
FIG. 4 is a top perspective of an expansion water tank component that can be used in the present invention.

Aspects of the exterior of the tank 14 are shown in more detail in the inlet side, top perspective of FIG. 2 and outlet side, top perspective of FIG. 3. The tank 14 is manufactured with several outward-directed, cylindrical stubs, which can be used for different connections depending on the installation and application. With reference to FIG. 2, in a representative installation one such stub 38 is used for connection of the inlet fitting 12 for entry of grey water into the tank. One or both of the stubs 40 adjacent to stub 38 can be used to vent the tank. Stub 42, below the inlet stub 38, can be used for connecting an expansion tank, such as of the type shown in FIG. 4. The expansion tank 44 shown in FIG. 4 has an upright concave side 46 to fit against an upright convex side 48 (FIG. 2) of the main tank 14. A conduit can be used to connect the main tank stub 42 to a stub 48 (FIG. 4) on the expansion tank.

This increases the holding capacity for filtered water, making it less likely that an overflow condition will be reached. The expansion tank 44 of FIG. 4 can be provided with an upward extending vent tube 50 which is shown capped in FIG. 4 but which would extend to a suitable venting elevation.

With reference to FIG. 3, the opposite side of the tank 14 (i.e., the outlet side) also has several outward extending cylindrical stubs. The upper central stub 52 can be used for the overflow tube which can be fitted to the overflow pipe 33 leading to a suitable area for discharge or collection of overflow grey water. In the particular application shown, an outlet conduit 54, which connects to the pump outlet 22 seen in FIG. 1, extends through a side stub 56. The outlet conduit leads to the secondary filtering system (described below with reference to FIG. 12) which has a return line 58 that extends through a side stub 60, back into the tank to the fitting 24 seen in FIG. 1. An additional stub 62 can be used for introducing fresh water into the tank (described below with reference to FIG. 15), during periods when it is known grey water will not be sufficient for the intended use, such as landscape or garden irrigation. A large bottom stub 64 can be used for interconnecting two or more tanks together for larger filtering installations requiring additional storage capacity, filters, pumps, and so on—all of the aspects of a larger filter system, such as for a multiple family dwelling.

Figure 5:
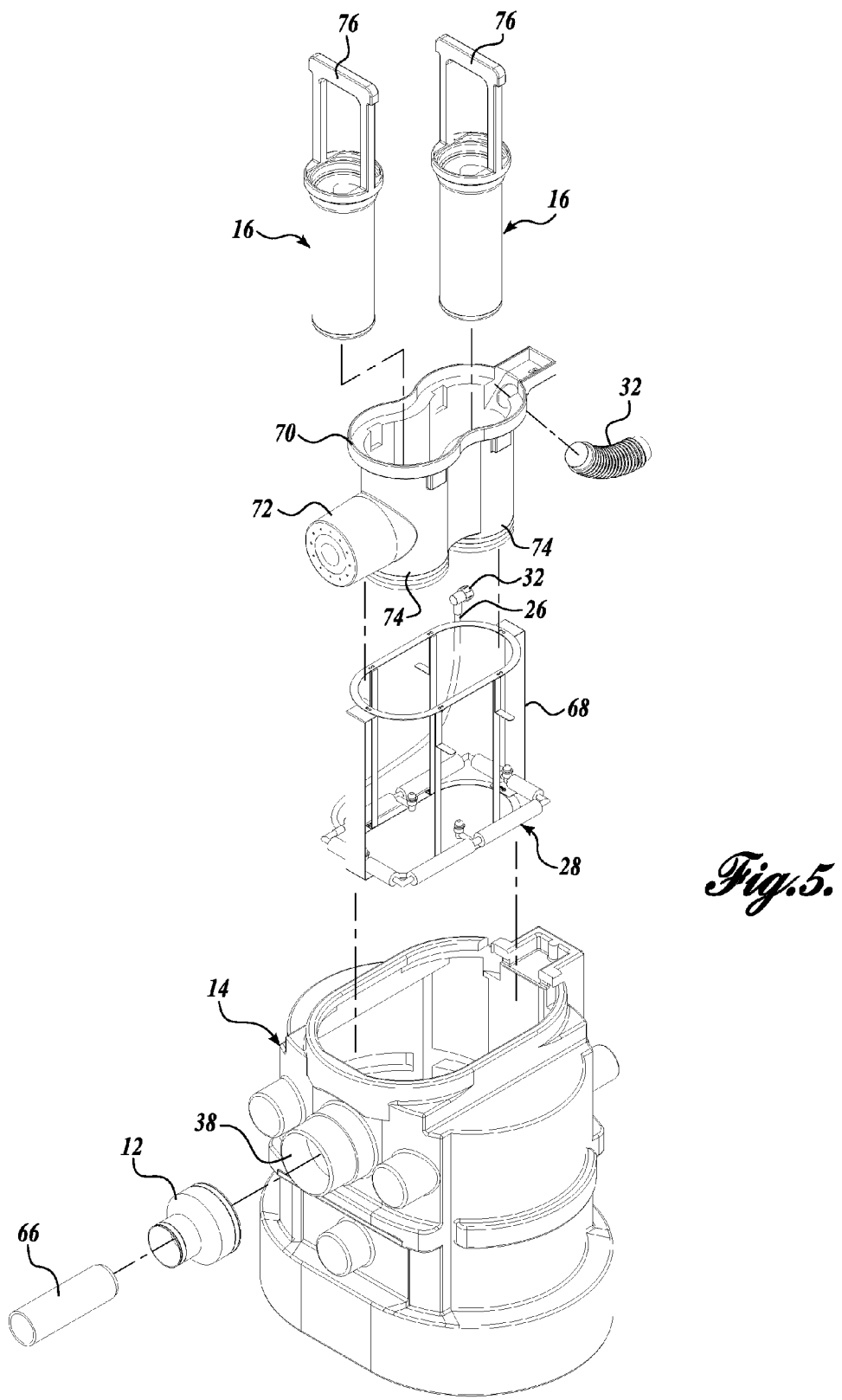
FIG. 5 is an inlet side, top perspective showing components of a system in accordance with the present invention in exploded relationship, with the tank of FIGS. 1 and 2 at the bottom.

FIG. 5 is an inlet side, top perspective showing components of the system in exploded relationship, with the tank 14 at the bottom. The inlet fitting 12 is secured on the inlet stub 38. The fitting includes a smaller diameter pipe 66 that extends part way into the stub 38 and that carries all of the grey water from the mainline 10 (FIG. 1) into the tank. The floating spray assembly 28 includes a support and guide frame 68, which fits in the bottom of the tank. Next comes a filter carriage 70 that fits in the upper portion of the tank and has an inlet stub 72 designed to mate with the inlet pipe 66, as described in more detail below. The spray assembly inlet conduit 26 extends above the upper portion of the frame 68 to the fitting 32. Each of the filter units 16 can be inserted downward through holes in the cylindrical, downward extending portions 74 of the filter carriage. Each filter unit can have an upward extending handle 76 for convenient insertion and removal, such as for cleaning (the handles have been deleted in FIG. 1, but extend up inside the filter carriage).

FIG. 6 is an inlet side, top perspective illustrating the filter carriage 70 in more detail. The inlet stub 72 has an annular, vertical flange 78. A resilient gasket 80 is secured on the flange by a retainer ring 82. The center opening 84 of the resilient gasket is smaller than the outer diameter of the inlet pipe 66 of the inlet fitting 12. When the parts are assembled, the fitting 12 includes the inward extending pipe 66 secured on the tank, and the filter carriage is inserted through the top of the tank with the gasket 80 snugly receiving the inlet end portion of pipe 66 to achieve a watertight seal and securely seat the carriage 70 in the tank. Resilient cup-shaped gaskets 86 are secured on the downward extending cylindrical portions 74 of the filter carriage (i.e., the portions having the holes for the filters). The resilient gaskets 86 have openings 88 that snugly receive the cylindrical portions of the filters when the filters are inserted. The lip portions 90 of the gaskets 86 are secured to the lower portions 74 of the carriage, such as by clamps.

FIG. 7 illustrates the filter carriage 70 fitted in the tank 14 in position for reception of the filter units 16. Such filter units can be simply inserted downward so that the cylindrical bottom portions pass through the gaskets 86 described above with reference to FIG. 6. The upper ends of the cylindrical portions of the filter units have additional tapered (inverted frustoconical) resilient gaskets 92 to seat in the holes in the bottom of the filter carriage.

FIGS. 8 and 9 show the filter units 16 in more detail. The bottom cylindrical part of each filter unit includes a cylindrical mesh screen 94 that fits over a rigid frame 96. The frame has a central enlarged flange portion 98 against which the top of the screen engages when fully inserted (the tapered gaskets 92 of FIG. 7 are not shown in FIGS. 8 and 9 but fit on the stepped portion of the flange 98). The screen can be held in place by a pronged retainer 100 and wing nut 102 at the bottom. The inverted U handle 76 projects upward from the top of the flange portion 98. When assembled and inserted into the carriage, each filter has its inner periphery or "inlet surface" exposed to water from the tank inlet and its outer periphery or "outlet surface" exposed to water that has passed through the filter.

Figure 10:
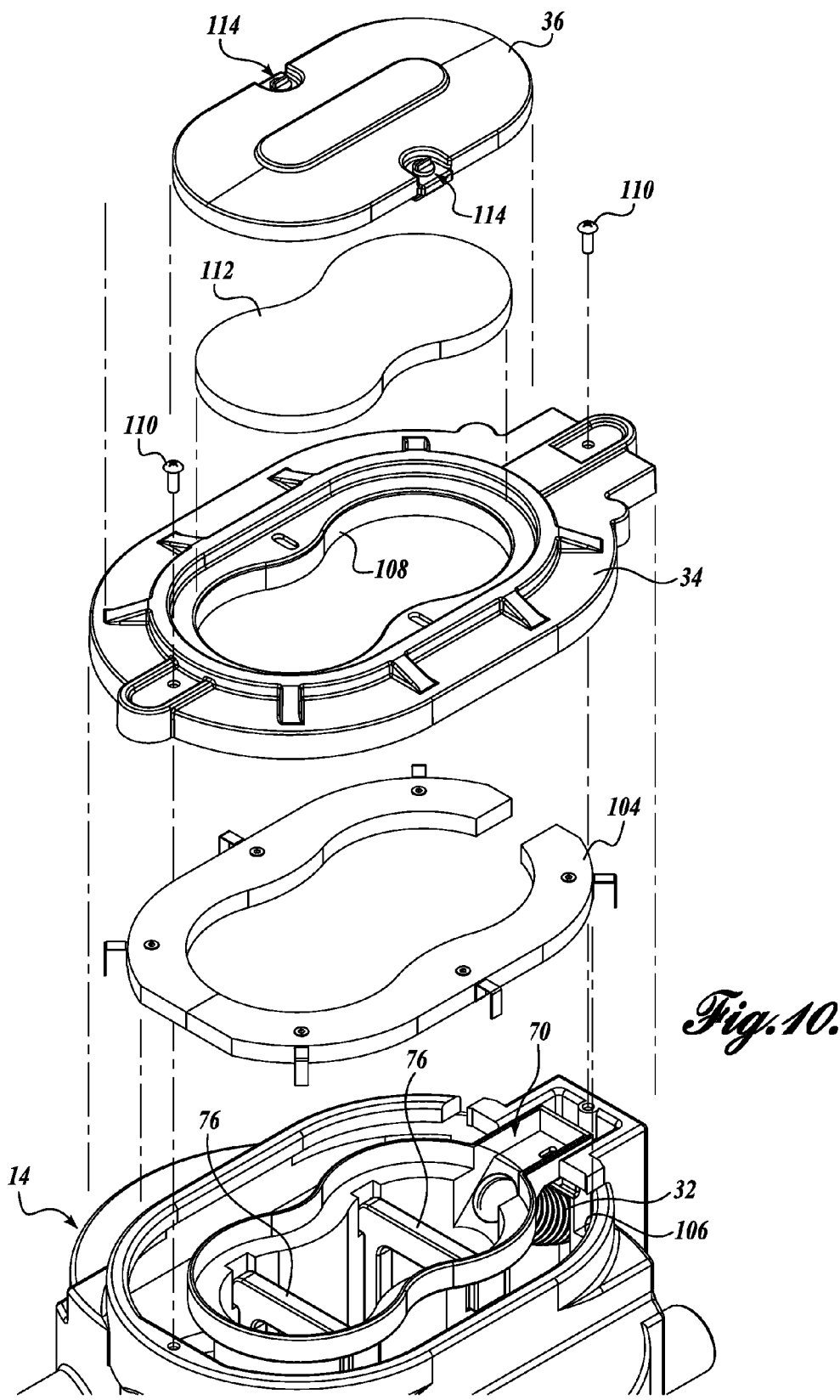
FIG. 10 is a top perspective of lid and cap components that can be used in the present invention, with parts shown in exploded relationship.
Figure 11:
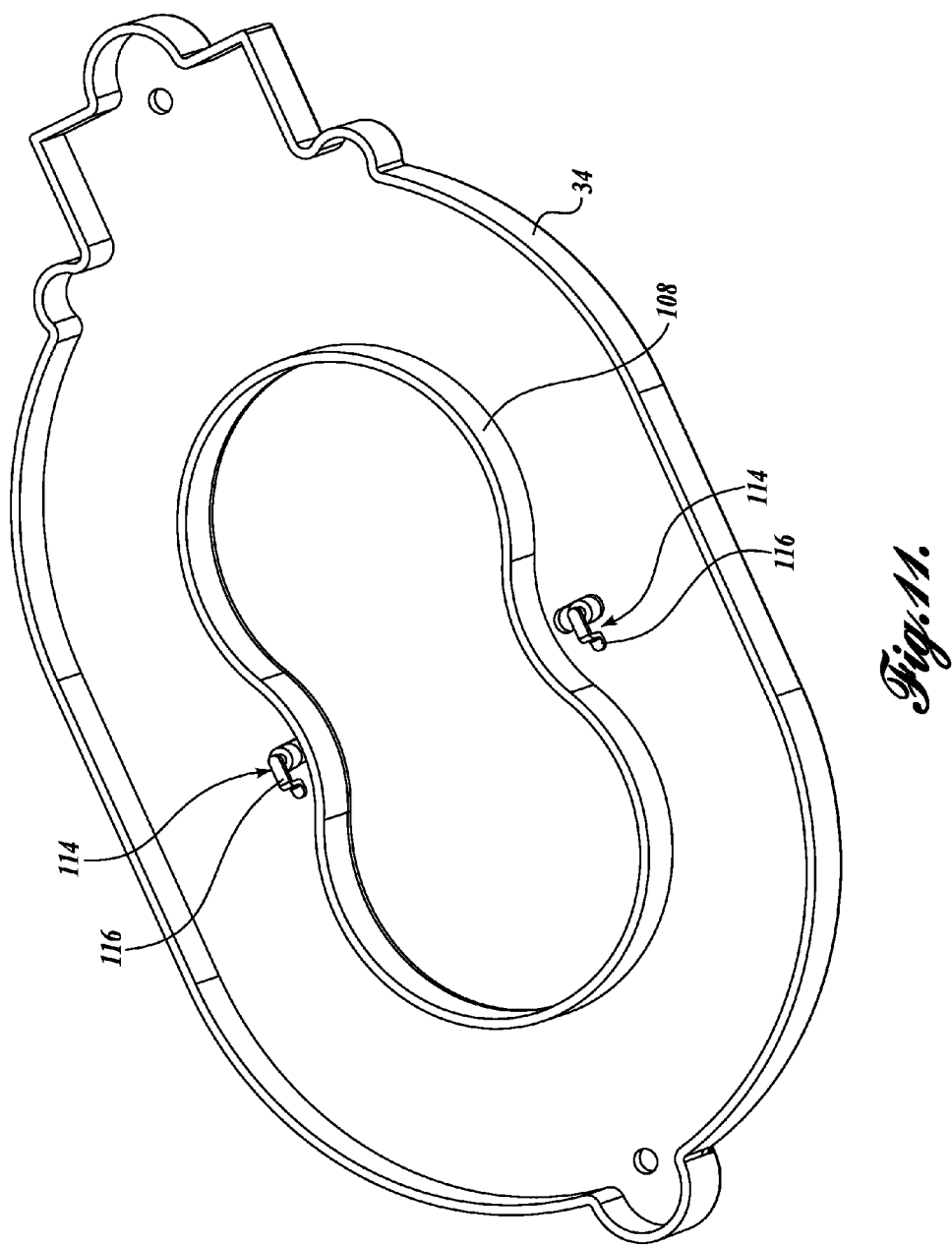
FIG. 11 is a bottom perspective the lid component.

In some applications, the tank will be mounted with its top at or below ground level and it is important to prevent excess debris from entering the tank when it is serviced. The lid and cap assembly is best described with reference to the fragmentary top perspective of FIG. 10, which shows some parts in exploded relationship. In the condition of FIG. 10, the filter carriage 70 has been fitted in the tank with the flexible overflow conduit 32 received in whatever overflow drainage pipe is used. The other side of the filter carriage has the gasket that seats over the inlet pipe. The filter carriage is contoured for reception of the upper ends of the handles 76 of the filter units. In this condition, the top edge of the filter carriage is essentially flush with the open top of the tank 14. A fibrous mat 104 is contoured to fit snugly around the carriage and close the space that otherwise would be open between the outer edge of the filter carriage 70 and the corresponding edge of the tank opening 106. The lid section 34 fits down over the matting, with a narrow downward extending lip 108 that fits inside the correspondingly contoured (i.e., kidney shaped) top opening of the filter carriage 70. Lid 34 can be secured to the tank by screws or bolts 110 or another suitable fastening system, and an additional gasket can be provided between the top edge of the tank 14 and the bottom of the lid 34. Next, a mat 112 (such as a closed cell foam) is fitted in the opening of the lid 34. The fit of the mat in the lid is tight or at least snug. The top cap 36 fits down over the mat and has latches 114 that secure the cap to the lid. The underside portions of representative latches can be seen in FIG. 11. Bent fingers 116 are rotatable to hook under the lid for a firm interconnection of the cap to the lid.

Figure 12:
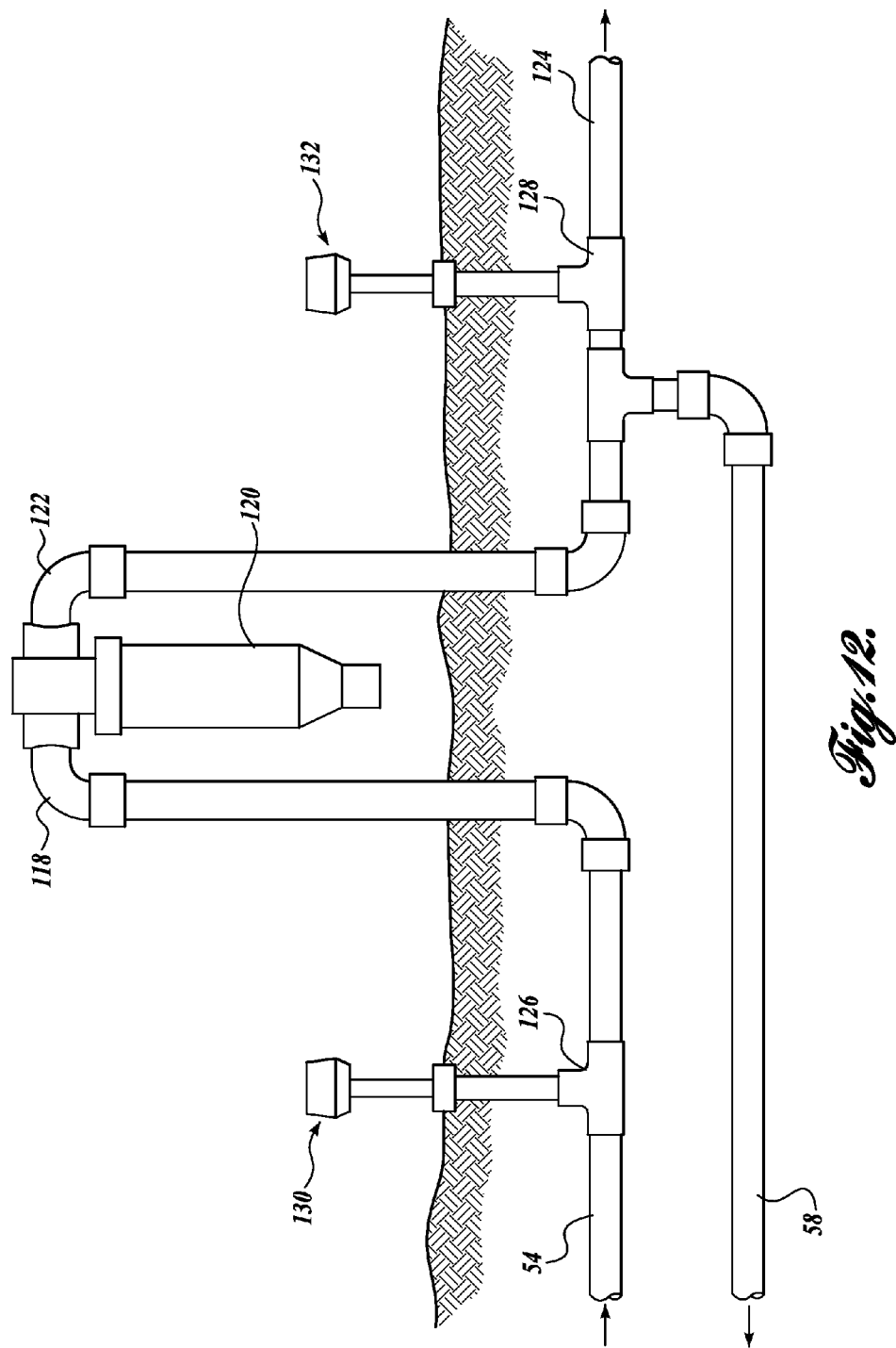
FIG. 12 is a diagrammatic side elevation of a secondary filter component and status signal components that can be used in the present invention.

Aspects of a secondary filtering system are shown diagrammatically in FIG. 12. The outlet conduit 54 that extends out of the tank and carries water pressurized by the internal pump leads to the inlet 118 of the secondary filter, which includes the downward-extending filter cartridge 120. Filtered water is conveyed through the secondary filter outlet 122 to a conduit 124 that feeds the irrigation system. However, some of the water from the secondary filter is fed back through the return conduit 58, into the main tank and to the fitting and conduit for the backwash spray assembly (24, 26, 28 as shown in FIG. 1, described in more detail below with reference to FIGS. 13 and 14). Further, there is a small branch 126 from the main pump outlet pipe 54, and a similar branch 128 from the irrigation supply conduit 124 for pop up status indicators 130, 132 which are projected upward when their respective water conduits are under pressure, but which retract when the water is not under pressure (i.e., the pump is turned off). Such indicators provide a convenient check on the status of the system and may be useful in troubleshooting. For example, if the pump is activated and indicator 130 is up but indicator 132 is down, there is a problem in the secondary filter; both indicators down with the pump on would typically indicate a problem in the main tank, such as clogged filters, and so on. At any rate, in normal use water supplied to a drip irrigation system is filtered once in the main tank and again in the secondary system to prevent introduction of particulates into the small drip irrigation nozzles. Similarly, water supplied through line 58 back to the backwash spray assembly is filtered twice to lessen the possibility of the small spray nozzles of the backwash spray assembly becoming clogged.

Figure 14:
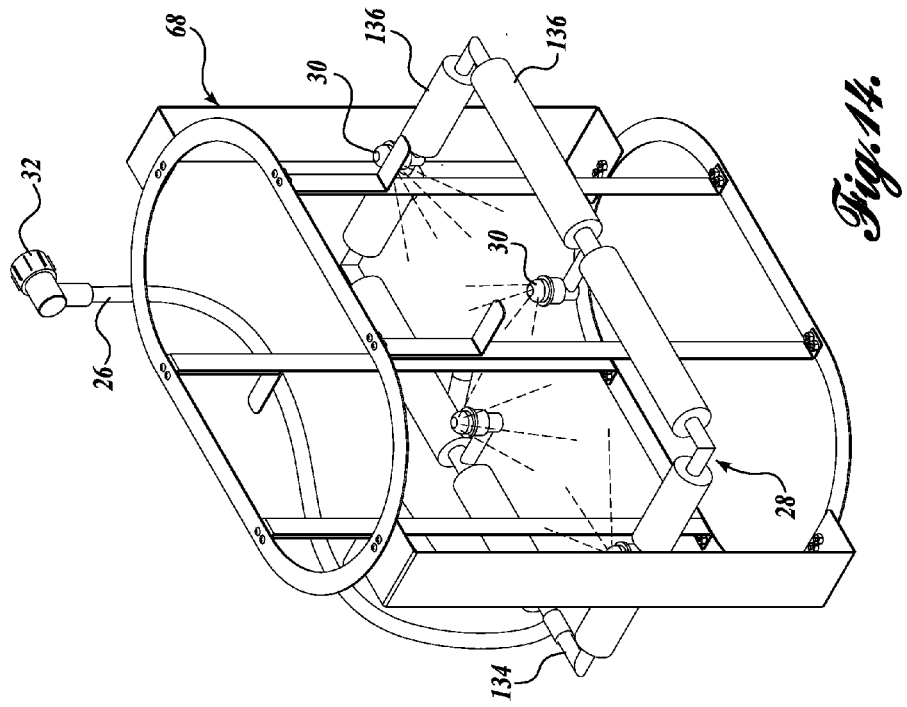
FIG. 14 is a corresponding top perspective with parts in different positions.
Figure 13:
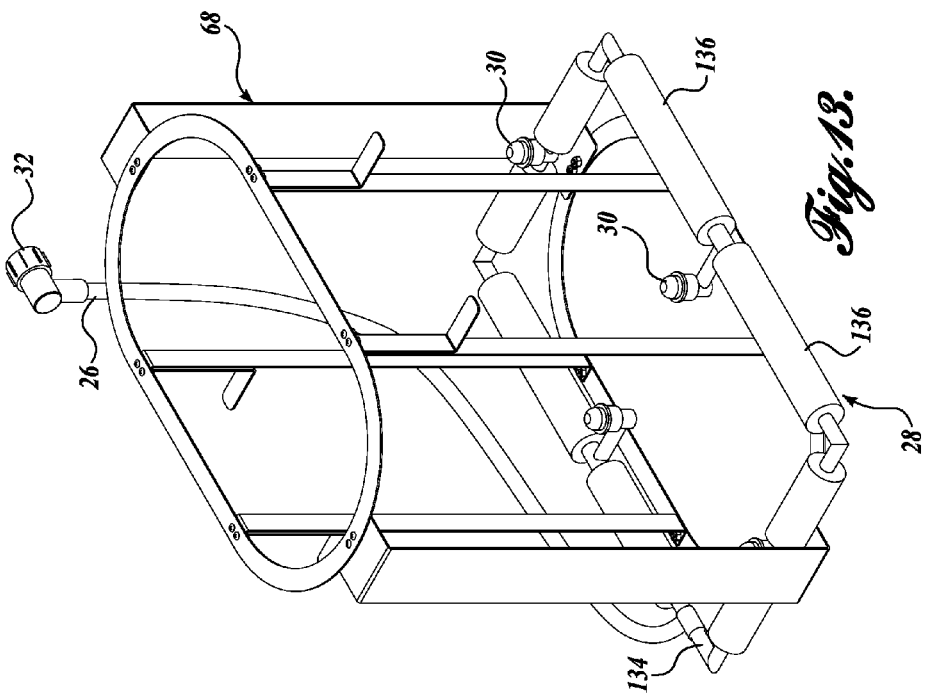
FIG. 13 is a top perspective of backwash spray assembly components that can be used in the present invention.

Aspects of the backwash spray assembly are best seen in FIGS. 13 and 14. As previously described, the top fitting 32 to which the return pipe from the secondary filter is connected leads to the spray assembly inlet conduit 26. Conduit 26, in turn, feeds the supply ring 134 which, in the case of the illustrated embodiment, is rectangular. Floats 136 are mounted on the supply ring, and the moderate to high pressure nozzles 30 are fed by branches from the ring 134. The ring is free to float up and down in reaction to an increase or decrease in the level of water in the tank. FIG. 13 shows the lowermost position in which the ring is adjacent to the bottom of the tank, which would correspond to the off position of the internal float switch. As the level of water in the tank increases, the ring rises with it, and the float switch is turned on. Water from the pump (after passing through secondary filter system) is fed to the ring supply conduit and to the individual nozzles 30 which are directed inward toward the exterior sides, i.e., outlet surfaces, of the filter screens. Preferably such nozzles have inward directed outlet slits with internal rotary sprays that fan across the filter assemblies to substantially continuously backwash the filter screens when the pump is on without unduly interfering with an outward directed flow of water through the filters and to the pump. The mounting frame 68 can have appropriate stops to limit the extent to which the floating ring can rise. Also, the top of the frame can have an aperture sized to receive the downward projecting part of the filter carriage and assist in securely seating it in the tank.

Figure 15:
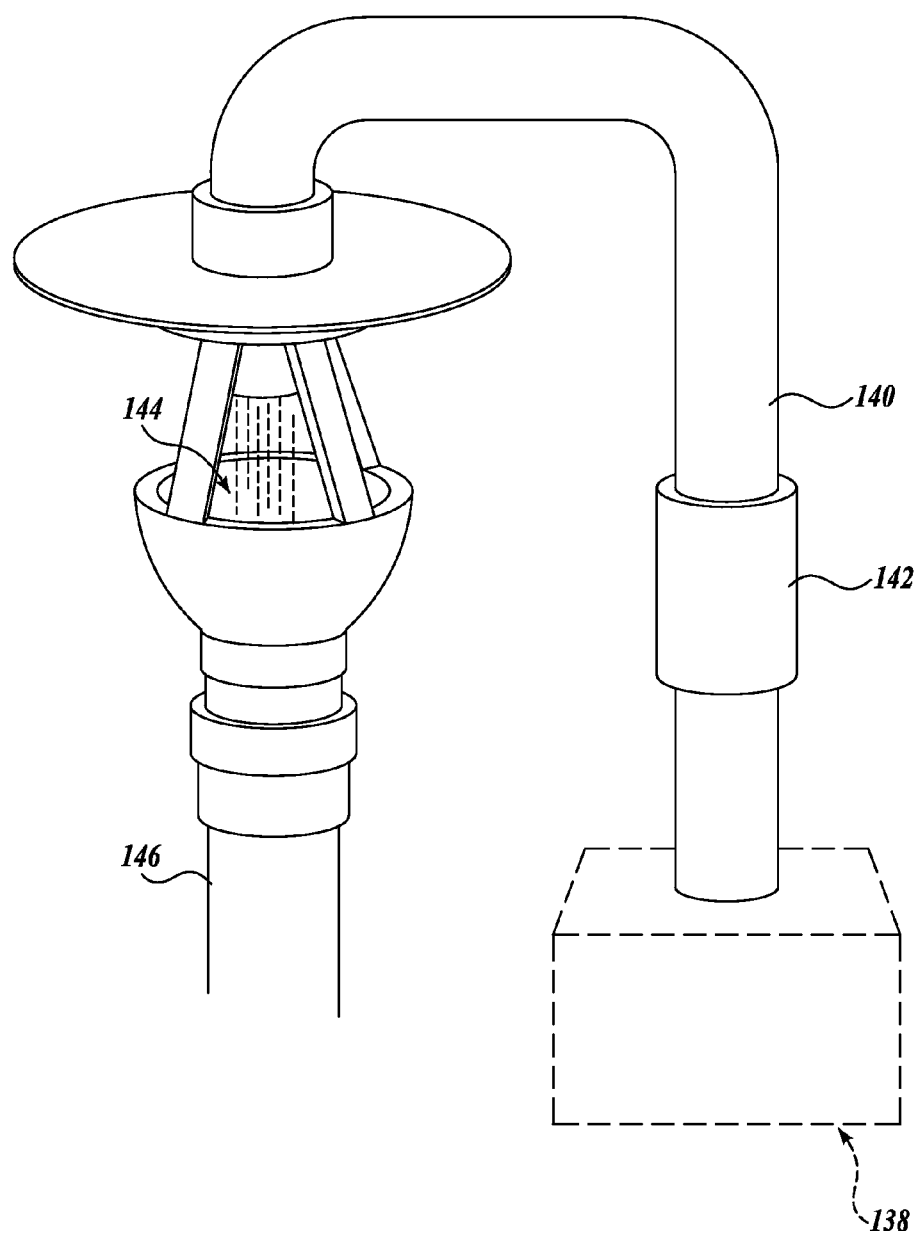
FIG. 15 is a diagrammatic top perspective of an auto-fill component that can be used in the present invention.

Another optional component for the filtering system is illustrated diagrammatically in FIG. 15, namely, an "autofill" component to supply fresh water to the tank during periods when it is known that grey water will not be sufficient to achieve the desired irrigation. In FIG. 15, the broken line box 138 represents the fresh water supply which can be, for example, a typical spigot from the water supply for the establishment of concern, and a conventional valve with a controller such as an automatic daily timer which opens the supply for a predetermined period, at predetermined times each day, week, etc. During such times, water is fed through a supply pipe 140 by way of a flow restrictor 142 which can be tailored to the particular irrigation system such that the water supplied is equal to or approximately equal to the water required for the desired degree of irrigation. Such water flows into an inlet opening 144 for the auto fill pipe 146 which can lead to the tank, such as through the stub 62 shown in FIG. 3.

The component parts of the system can be installed quickly and easily to achieve a robust, low maintenance filter system which processes grey water from a variety of sources for other uses. Once the tank and piping have been installed, maintenance can be achieved by convenient above-ground access. The filter units 16 are accessible by removing only the cap 36 and top mat 112. Then the filter units can be pulled out vertically by their handles 76, and disassembled for washing their screens. The reassembled filters can be inserted down through the filter carriage gaskets, which stretch over the screens for a snug fit. The top gaskets of the filters also seat in the bottom projections of the carriage.

At times it may be desirable to access components below the carriage for cleaning, maintenance or repair. This is achieved by removing the cap and filters as described above, then the lid 34 and its mat 112. The carriage can be manipulated to remove it from the tank. This provides access to the lower components such as the pump and backwash spray assembly. Reassembly is achieved by reversing the steps, namely, first inserting the filter carriage stub 72 into the tank stub 38, which stretches the carriage gasket over the inlet pipe 66 of the corresponding fitting 12. The flexible overflow tube 32 can be guided into its fitting. The lower portion of the carriage fits in the spray frame 68 to complete the seating of the carriage. The matted material 104 centers the carriage and prevents debris from falling into the tank at the outside of the carriage. Next the lid is reinstalled, then the filter units, the upper mat, and, finally the top cap.

While illustrative embodiments have been illustrated and described, it will be appreciated that various changes can be made therein without departing from the spirit and scope of the invention.

The embodiments of the invention in which an exclusive property or privilege is claimed are defined as follows:

1. A grey water filtering system comprising:
    a tank having an internal cavity for receiving water, an inlet for conveying water into the tank, and an outlet for conveying water out of the tank;
    a filter assembly received in the tank and including a filter disposed between the inlet and outlet and constructed and arranged such that water passing from the tank inlet to the tank outlet passes through the filter, the filter having an inlet surface exposed to water from the tank inlet and an outlet surface exposed to water that has passed through the filter; and
    a backwash assembly including at least one nozzle, a float carrying the at least one nozzle for movement up and down in reaction to an increase and decrease in the level of water in the tank, and a pump supplying water under pressure to the at least one nozzle, the at least one nozzle being mounted to direct pressurized water at the outlet surface of the filter for a backwash cleaning effect.

2. The filtering system defined in claim 1, including a float switch controlling actuation of the pump such that pressurized water is not supplied to the at least one nozzle when water is at a predetermined low level in the tank but the pump is actuated to supply pressurized water to the at least one nozzle when the level of water in the tank is at a predetermined higher level.

3. The filtering system defined in claim 1, in which the backwash assembly includes a guide frame mounted in the tank, the at least one nozzle being guided in up and down movement by the frame.

4. The filtering system defined in claim 3, in which the filter has a cylindrical mesh portion oriented vertically in the tank, the filter inlet surface being the inner periphery of the cylindrical mesh portion, the backwash assembly including a float ring encircling the cylindrical mesh portion, the at least one nozzle and a plurality of additional nozzles being mounted on the float ring and directed inward to supply pressurized water at the exterior surface of the cylindrical mesh portion.

5. The filtering system defined in claim 1, in which the tank inlet includes an inlet conduit having an inner end portion extending into the interior cavity of the tank, the filter assembly including a filter carriage insertable into the tank, the filter carriage having an annular sealing gasket sized and positioned to stretch over the inlet conduit inner end portion as the filter carriage is inserted.

6. The filtering system defined in claim 1, in which the filter is cylindrical, the filter assembly including a filter carriage insertable into the tank, the filter carriage having a bottom hole through which the filter is inserted, the bottom hole of the filter carriage having an annular sealing gasket sized and positioned to stretch over the filter as the filter is inserted.

7. The filtering system defined in claim 6, in which the filter includes an upper end portion including a resilient tapered gasket portion to fit and seal in the hole of the filter carriage when the filter is inserted therein.

8. The filtering system defined in claim 1, in which the tank has an overflow outlet extending from the upper portion of the interior cavity of the tank, the filter assembly including a filter carriage insertable into the tank and having a flexible overflow conduit constructed and arranged to fit with the tank overflow outlet when the filter carriage is fitted in the tank and provide a fluid passage for overflow water from the tank inlet to the tank overflow outlet that bypasses the filter.

9. The filtering system defined in claim 1, in which the tank includes an upper edge defining a top opening, and including a lid and cap assembly for closing the top opening of the tank, a filter carriage insertable into and removable from the tank with the lid removed, the filter being removable from the carriage with the lid in place but the cap removed, and a mat component extending between and closing the space between the upper edge of the tank and an adjacent edge of the filter carriage.

10. The filtering system defined in claim 1, including a secondary filtering component located outside the tank, a supply conduit in fluid communication between the tank outlet and an inlet side of the secondary filtering component, and a return conduit in fluid communication between an outlet side of the secondary filtering component and the at least one nozzle to supply water filtered by the secondary filtering component to the at least one nozzle.

11. The filtering system defined in claim 10, including a first pressure status indicator located outside the tank and in fluid communication with the supply conduit to provide an indication of the pressure therein, and a second pressure status indicator located outside the tank and in fluid communication with the supply conduit to provide an indication of the pressure therein.

12. The filtering system defined in claim 1, including an auto-fill component constructed and arranged to automatically provide water to the tank at predetermined times.

\* \* \* \* \*